(12) United States Patent
Tringali

(10) Patent No.: US 12,423,022 B2
(45) Date of Patent: Sep. 23, 2025

(54) PAGE TABLE ENTRIES FOR UNCOMPRESSED PAGE CACHING

(71) Applicant: Rambus Inc., San Jose, CA (US)

(72) Inventor: J. James Tringali, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/367,241

(22) Filed: Sep. 12, 2023

(65) Prior Publication Data

US 2024/0103758 A1 Mar. 28, 2024

Related U.S. Application Data

(60) Provisional application No. 63/409,149, filed on Sep. 22, 2022.

(51) Int. Cl.
*G06F 3/06* (2006.01)

(52) U.S. Cl.
CPC .......... *G06F 3/0656* (2013.01); *G06F 3/0608* (2013.01); *G06F 3/0679* (2013.01)

(58) Field of Classification Search
CPC .... G06F 3/0656; G06F 3/0608; G06F 3/0679; G06F 3/064; G06F 2212/401
See application file for complete search history.

(56) References Cited

U.S. PATENT DOCUMENTS

| | | | |
|---|---|---|---|
| 6,349,372 B1 | 2/2002 | Benveniste et al. | |
| 6,779,088 B1 | 8/2004 | Benveniste et al. | |
| 7,636,810 B2 | 12/2009 | Ramakrishnan | |
| 7,984,240 B2 | 7/2011 | Borkenhagen | |
| 8,135,903 B1 * | 3/2012 | Kan | G06F 12/0246 711/103 |
| 9,606,937 B1 * | 3/2017 | Marathe | G06F 12/0866 |
| 2006/0101223 A1 * | 5/2006 | Lekatsas | H03M 7/30 711/E12.017 |
| 2007/0016719 A1 * | 1/2007 | Ono | G06F 12/0804 711/E12.04 |
| 2007/0245097 A1 * | 10/2007 | Gschwind | G06F 9/30178 711/154 |
| 2021/0216475 A1 * | 7/2021 | Kucherov | G06F 12/0871 |

* cited by examiner

*Primary Examiner* — Chie Yew
(74) *Attorney, Agent, or Firm* — The Neudeck Law Firm, LLC

(57) ABSTRACT

A buffer/interface device of the memory node may read and compress blocks of data (e.g., pages). When a memory buffer device compresses a block of data, it may keep storing the original uncompressed version in the original memory location (e.g., physical memory page). In this manner, an access directed to the block of data may be satisfied with the uncompressed version retrieved from the original memory location (e.g., physical memory page) without having to perform a decompression operation. As memory space is needed for other purposes (e.g., for an uncompressed copy of a recently decompressed block or as host allocated memory occupies more space), the original uncompressed versions of blocks (pages) that have not been accessed relatively recently (e.g., relative to other kept original uncompressed versions) may be evicted and replaced by other blocks of data (e.g., either compressed or uncompressed).

20 Claims, 12 Drawing Sheets

| ACCESS INDCTR | PTR TO UNCMP PAGE | PTR TO CMP PAGE | INDEX |
|---|---|---|---|
| CNT1 < THRESHLD1 | PTR TO PHY PAGE "A" | NULL | INVAL |

*FIG. 5A*

| ACCESS INDCTR | PTR TO UNCMP PAGE | PTR TO CMP PAGE | INDEX |
|---|---|---|---|
| CNT2 > THRESHLD1 | PTR TO PHY PAGE "A" | NULL | INVAL |

*FIG. 5B*

| ACCESS INDCTR | PTR TO UNCMP PAGE | PTR TO CMP PAGE | INDEX |
|---|---|---|---|
| CNT3 > THRESHLD1 | PTR TO PHY PAGE "A" | PTR TO PHY PAGE "B" | LOC OF CMPSD "A" |

*FIG. 5C*

| ACCESS INDCTR | PTR TO UNCMP PAGE | PTR TO CMP PAGE | INDEX |
|---|---|---|---|
| CNT4 = MAX OF PAGES | NULL | PTR TO PHY PAGE "B" | LOC OF CMPSD "A" |

*FIG. 5D*

```
┌─────────────────────────────────────────────────────────┐
│  COMPRESS A FIRST UNCOMPRESSED VERSION OF A FIRST PAGE OF│
│  MEMORY TO PRODUCE A COMPRESSED VERSION OF THE FIRST PAGE│
│                         OF DATA                          │
│                           602                            │
└─────────────────────────────────────────────────────────┘
                             │
┌─────────────────────────────────────────────────────────┐
│ WRITE THE COMPRESSED VERSION OF THE FIRST PAGE OF DATA TO A│
│  FIRST PORTION OF A SECOND PAGE OF MEMORY, WHERE THE FIRST│
│   PORTION DOES NOT CONSIST OF AN ENTIRETY OF THE SECOND PAGE│
│                        OF MEMORY                         │
│                           604                            │
└─────────────────────────────────────────────────────────┘
                             │
┌─────────────────────────────────────────────────────────┐
│  BASED ON AN ACCESS DIRECTED TO THE FIRST PAGE OF DATA,  │
│    RESPOND TO THE ACCESS WITH THE FIRST UNCOMPRESSED     │
│ VERSION OF THE FIRST PAGE OF DATA RETRIEVED FROM THE FIRST│
│                      PAGE OF MEMORY                      │
│                           606                            │
└─────────────────────────────────────────────────────────┘
```

*FIG. 6*

PAGE TABLE ENTRIES FOR UNCOMPRESSED PAGE CACHING

BRIEF DESCRIPTION OF THE DRAWINGS

FIGS. 5A-5D illustrate example page table entries.

FIG. 6 is a flowchart illustrating a method of operating a memory node.

DETAILED DESCRIPTION OF THE EMBODIMENTS

Figure 1A:
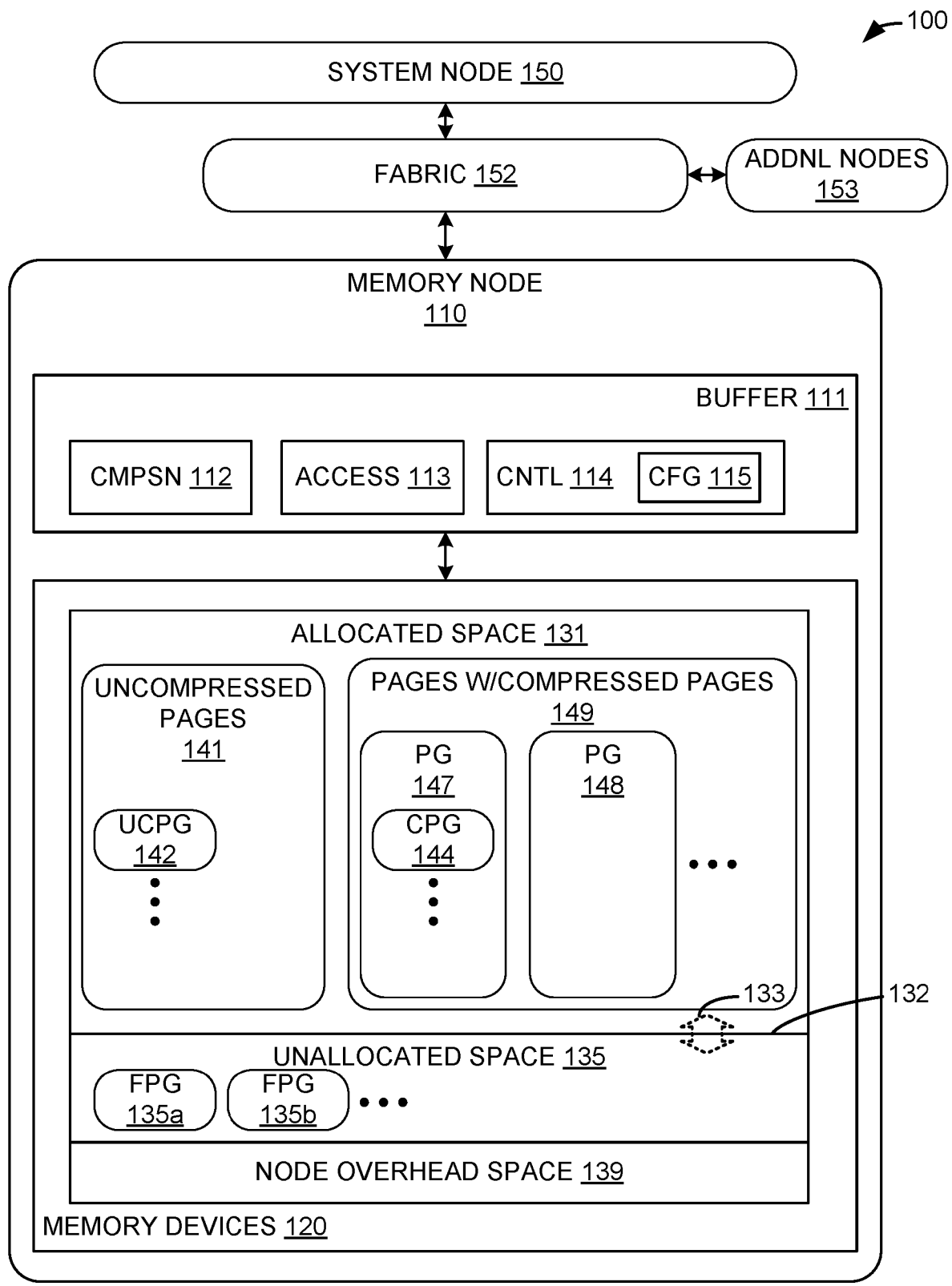
FIGS. 1A-1D illustrate a system with a memory node caching uncompressed pages.

In an embodiment, a memory node receives host physical addresses for accesses. In other words, the memory node receives addresses that are tied to the host's perception of physical memory and associated memory map and not necessarily the memory node's perception of the physical memory residing on the memory node. Thus, a memory node may not conform to the host's perception and/or memory map. This can allow the memory node to manage physical memory resources more efficiently by, for example, rearranging, compressing, and/or decompressing pages.

A buffer/interface device of the memory node may read and compress blocks of data (e.g., pages). The size of each of the resulting compressed blocks of data is dependent on the data patterns in the original blocks of data. Access to a compressed version of a block of data, however, takes more time than accessing an uncompressed version of the block of data as the compressed version needs to be decompressed before it can be used to respond to the access.

In an embodiment, when a memory buffer device compresses a block of data, it may keep storing the original uncompressed version in the original memory location (e.g., physical memory page). In this manner, an access directed to the block of data may be satisfied with the uncompressed version retrieved from the original memory location (e.g., physical memory page) without having to perform a decompression operation. In an embodiment, as memory space is needed for other purposes (e.g., for an uncompressed copy of a recently decompressed block or as host allocated memory occupies more space), the original uncompressed versions of blocks (pages) that have not been accessed relatively recently (e.g., relative to other kept original uncompressed versions) may be evicted and replaced by other blocks of data (e.g., either compressed or uncompressed).

FIGS. 1A-1D illustrate a system with a memory node caching uncompressed pages. In FIGS. 1A-1D, system 100 comprises system node 150, fabric 152, additional nodes 153, and memory node 110. Memory node 110 includes buffer device 111, and memory devices 120. The contents residing in memory devices 120 includes allocated space 131 (a.k.a., committed space), unallocated space 135 (a.k.a., free space), and node overhead space 139. As system 100 is operating, the size of allocated space 131 may grow and/or shrink. Thus, the relative size of allocated space 131 and unallocated space 135 may move as illustrated by double ended arrow 133.

Allocated space 131 includes pages storing uncompressed pages 141 (a.k.a., uncompressed pages 141) and pages storing one or more compressed pages 149 (a.k.a., compressed pages 149). Uncompressed pages 141 includes uncompressed page 142. Compressed pages 149 includes compressed page 147 and compressed page 148. In FIG. 1A, compressed page 147 is storing at least uncompressed page 144. Unallocated space 135 includes free pages 135a-135b. Control circuitry 114 includes configuration information 115.

System node 150, memory node 110, and additional nodes 153 are operatively coupled to fabric 152. System node 150, memory node 110, and additional nodes 153 are operatively coupled to fabric 152 to communicate and/or exchange information etc. with each other. Fabric 152 may be or comprise a switched fabric, point-to-point connections, and/or other interconnect architectures (e.g., ring topologies, crossbars, etc.). Fabric 152 may include links, linking, and/or protocols that are configured to be cache coherent. For example, fabric 152 may use links, linking, and/or protocols that include functionality described by and/or are compatible with one or more of Compute Express Link (CXL), Coherent Accelerator Processor Interface (CAPI), and Gen-Z standards, or the like. In an embodiment, system node 150, memory node 110, and additional nodes 153 are operatively coupled to fabric 152 to request and/or store information from/to that resides within other of system node 150, memory node 110, and/or additional nodes 153. In an embodiment, additional nodes 153 may include similar or the same elements as system node 150, and/or memory node 110 and are therefore, for the sake of brevity, not discussed further herein with reference to FIGS. 1A-1D.

In an embodiment, buffer device 111 includes compression/decompression circuitry 112 (hereinafter, "compression circuitry 112"), access circuitry 113, and control circuitry 114. Access circuitry 113 is operatively coupled to memory devices 120. Access circuitry 113 is configured to access at least one of memory devices 120 to access allocated space 131, unallocated space 135, and node overhead space 139 stored by memory devices 120. In particular, access circuitry 113 is configured to access at least one of memory devices 120 to access allocated space 131 and unallocated space 135 to access uncompressed pages 141, compressed pages 149, and free pages 135a-135b. In an embodiment, buffer device 111 may be, or comprise, a processor running a real-time operating system that utilizes node overhead space 139.

Memory node 110 (and buffer device 111, in particular) is operatively coupled to fabric 152 to receive, from system node 150, access requests (e.g., reads and writes). Access requests transmitted by system node 150 may include read requests (e.g., to read a cache line sized block of data) and write requests (e.g., to write a cache line sized block of data). In an embodiment, to respond to a read or write request, buffer device 111 may perform a page table walk to relate the addressed received from system node 150 to a physical address that is used by memory devices 120 (e.g., to address a cache line in one of uncompressed pages 141, compressed pages 149, or free pages 135a-135b).

Figure 1B:
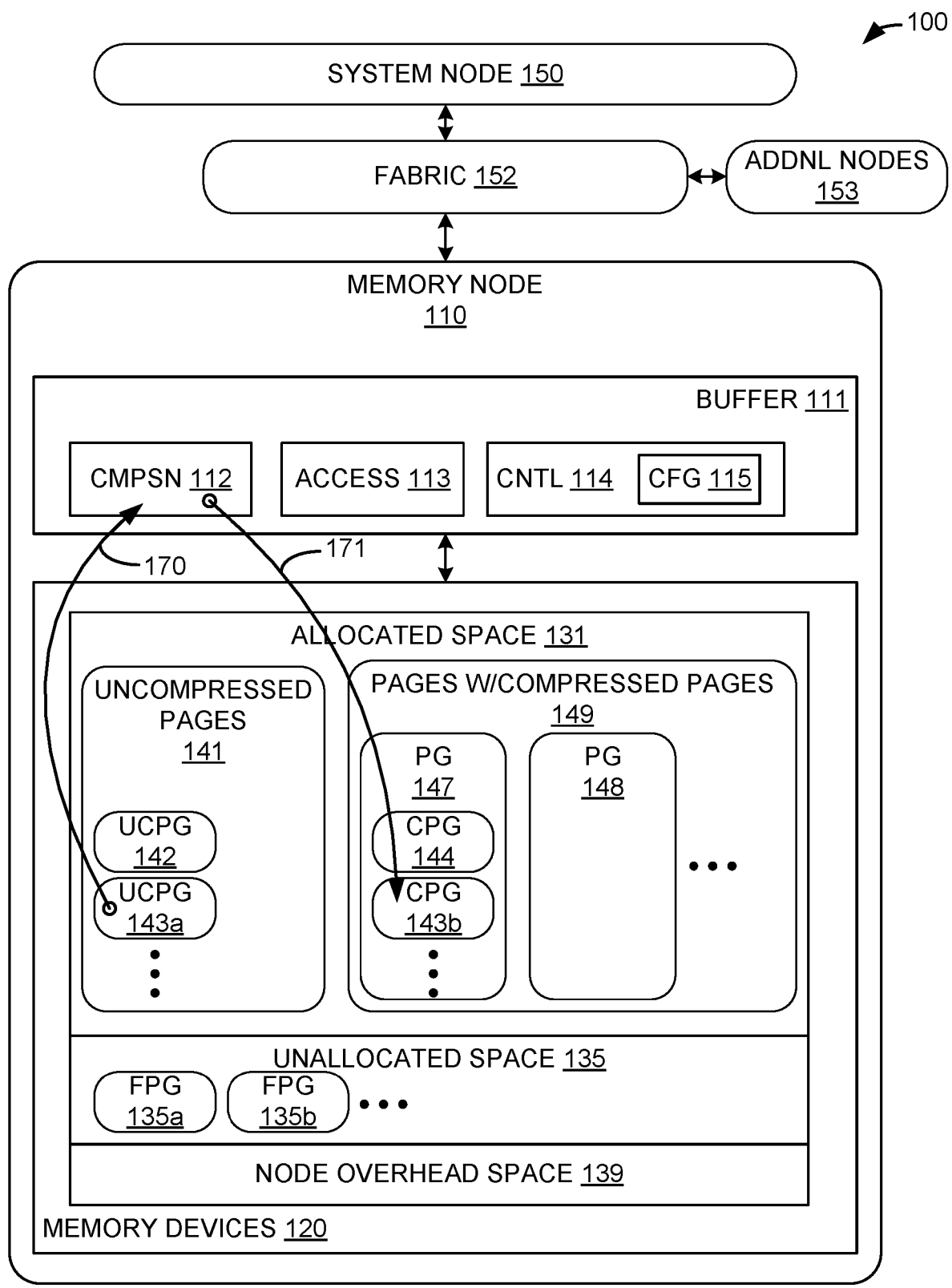
Figure 1C:
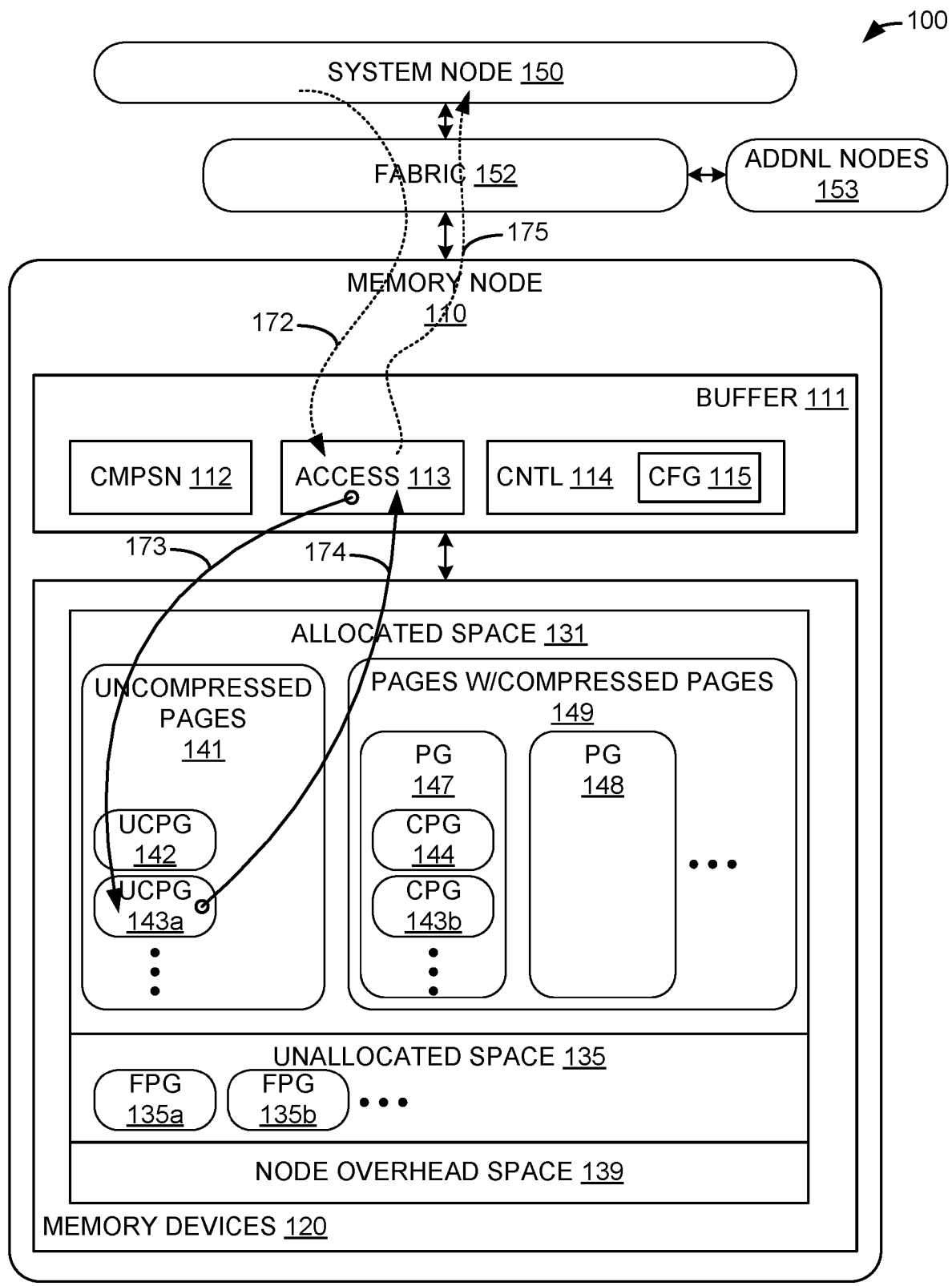
Figure 1D:
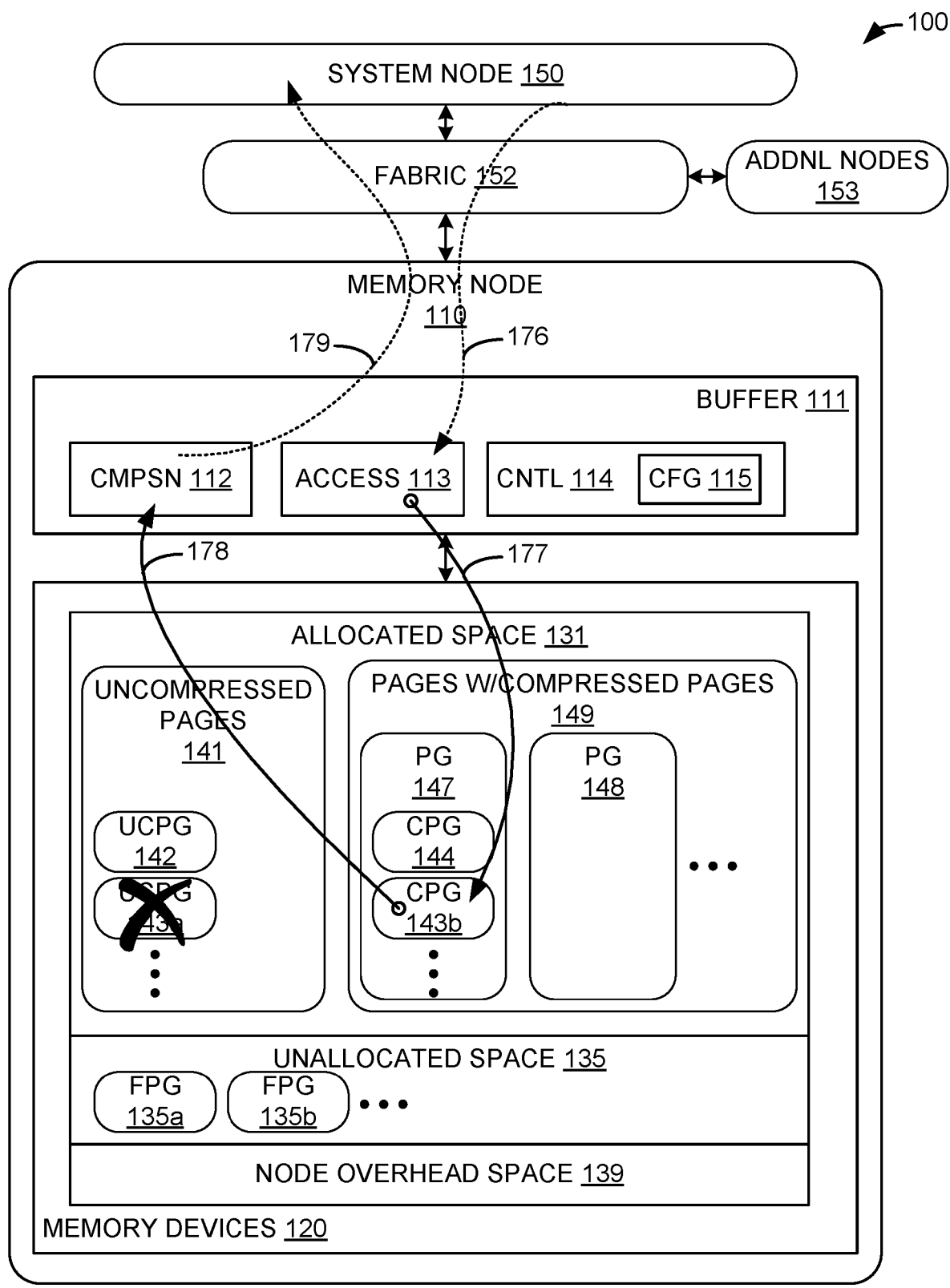

In FIG. 1B, uncompressed pages 141 includes uncompressed page 143a. In an embodiment, buffer device 111 of memory node 110 may select uncompressed page 143a to be compressed. Access circuitry 113 (e.g., under the control of control circuitry 114) may then read the selected uncompressed page 143*a* from memory devices 120 and provide the uncompressed page 143*a* to compression circuitry 112. This is illustrated in FIG. 1B by arrow 170 running from uncompressed page 143*a* in uncompressed pages 141 to compression circuitry 112. Buffer device 111 stores a compressed version 143*b* of uncompressed page 143*a* received from compression circuitry 112 in a portion of compressed page 147 as compressed page 143*b*. This is illustrated in FIG. 1D by arrow 171 running from compression circuitry 112 to compressed page 143*b* in compressed page 147.

In an embodiment, system node 150 may send a read access request directed to an address associated with uncompressed page 143*a* and compressed page 143*b*. This is illustrated in FIG. 1C by arrow 172 running from system node 150 through fabric 152 to access circuitry 113 in buffer device 111 of memory node 110. In response to the read access request, rather than decompressing compressed page 143*b* and providing the decompressed results to system node 150, buffer device 111 determines whether uncompressed page 143*a* may be accessed and if so, accesses uncompressed page 143*a* and provides uncompressed page 143*a* as read from memory devices 120 to system node 150. This is illustrated in FIG. 1C by arrow 173 running from access circuitry 113 to uncompressed page 143*a*, arrow 174 running from uncompressed page 143*a* back to access circuitry 113, and arrow 175 running from access circuitry 113 through fabric 152 to system node 150.

In an embodiment, when circumstances merit (e.g., need for more free pages, need for page to store new uncompressed page, etc.) buffer device 111 may evict (e.g., deallocate, overwrite, unlink, etc.) and/or stop using uncompressed page 143*a* to respond to accesses. Buffer device 111 may stop using uncompressed page copy 143*a* in order to make room for another uncompressed page (e.g., for a page that is being accessed more frequently than uncompressed page 143*a*). This is illustrated in FIG. 1D by the "X" over uncompressed page copy 143*a*. Once uncompressed page 143*a* is no longer being used to respond to access requests directed to the addresses associated with compressed page 143*b*, buffer device 111 stops providing uncompressed page 143*a* as read from allocated memory 131 in response to read requests directed to compressed page 143*d*. Rather, buffer device 111 provides compressed page 143*b* to compression circuitry 112 and the decompressed output of compression circuitry 112 is provided to system node 150. This is illustrated in FIG. 1D by arrow 176 running from system node 150 through fabric 152 to access circuitry 113 in buffer device 111 of memory node 110, arrow 177 running from access circuitry 113 to compressed page 143*b*, arrow 178 running from compressed page 143*b* to compression circuitry 112, and arrow 179 running from compression circuitry 112 to system node 150.

Figure 2:
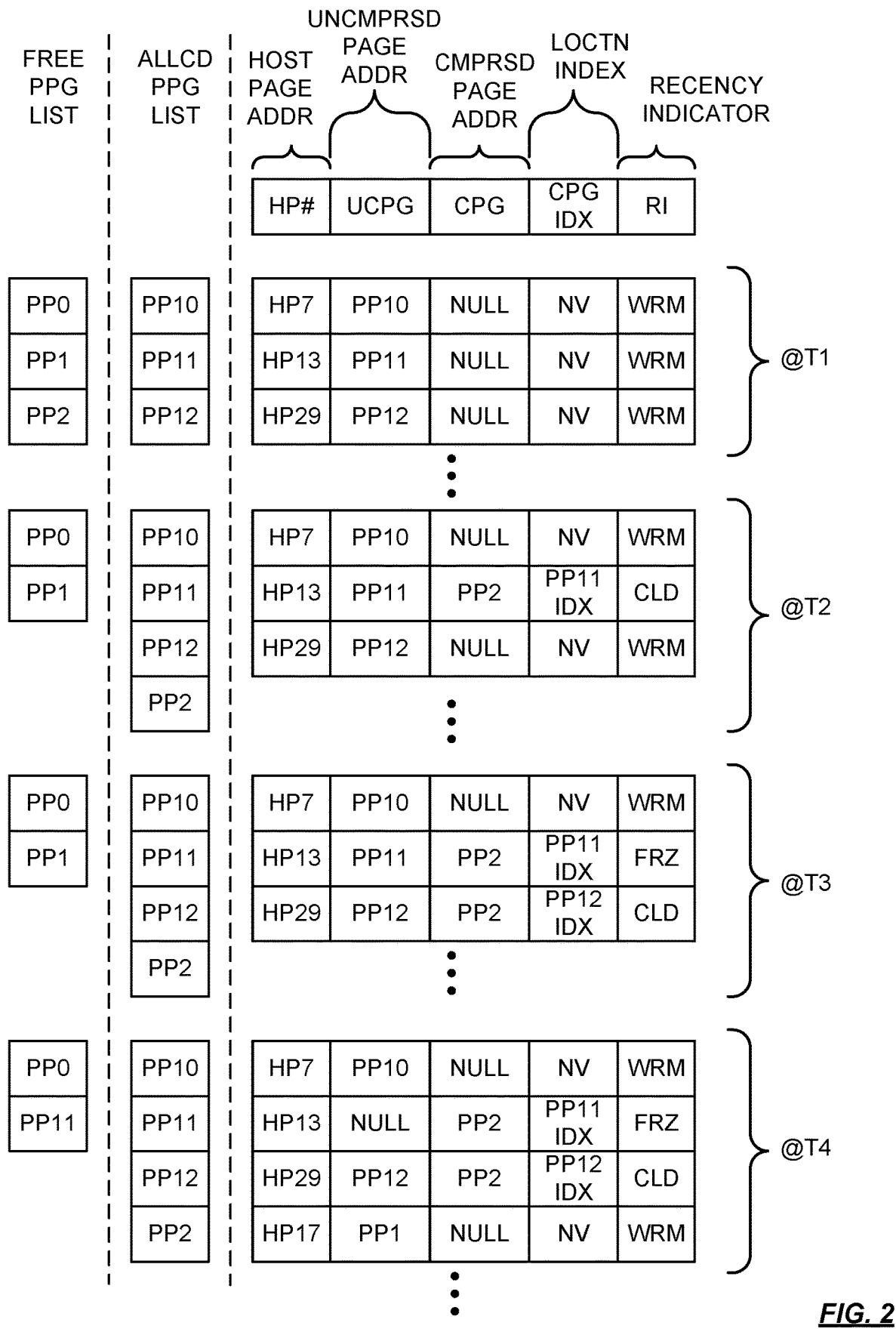
FIG. 2 is a diagram illustrating an example sequence that tracks cached uncompressed pages.

FIG. 2 is a diagram illustrating an example sequence that tracks cached uncompressed pages. In FIG. 2, page table entry 200 includes fields for at least a partial host page address (HP #), a pointer to an uncompressed page (uncompressed page address—UCPG), a pointer to a compressed page (compressed page address—CPG), a compressed page index (compressed page location index—CPG IDX), and a recency indicator (RI). At a first time instance (T1), FIG. 2 illustrates a free page list that includes (and/or points to) physical page 0 (PP0), physical page 1 (PP1), and physical page 2 (PP2). Allocated physical page list includes (and/or points to) physical page 10 (PP10), physical page 1 (PP11), and physical page 12 (PP12). A page table at time T1 includes entries for host page 7 (HP7), host page 13 (HP13), and host page 29 (HP29).

At time T1, the page table entry (PTE) for host page 7 is illustrated as indicating that the physical page 10 corresponds to the host page 7, and that there is no compressed physical page storing a compressed version of host page 7 or physical page 10 (therefore the CPG field is illustrated as a NULL pointer). Accordingly, since there is no compressed version of host page 7, the location index in the PTE for host page 7 is illustrated as not valid (NV). Finally, the recency indicator in the PTE for host page 7 is illustrated as indicating that host page 7 has been accessed relatively recently (e.g., is "warm").

Also at time T1, the PTE for host page 13 is illustrated as indicating that the physical compressed version of host page 13 or physical page 11 (therefore, the CPG field is illustrated as a NULL pointer). Accordingly, since there is no compressed version of host page 13, the location index in the PTE for host page 13 is illustrated as not valid (NV). Finally, the recency indicator in the PTE for host page 13 is illustrated as indicating that host page 13 has been accessed relatively recently (e.g., is "warm").

Also at time T1, the PTE for host page 29 is illustrated as indicating that the physical page 12 corresponds to the host page 29, and that there is no compressed physical page storing a compressed version of host page 29 or physical page 12 (therefore, the CPG field is illustrated as a NULL pointer). Accordingly, since there is no compressed version of host page 29, the location index in the PTE for host page 29 is illustrated as not valid (NV). Finally, the recency indicator in the PTE for host page 29 is illustrated as indicating that host page 29 has been accessed relatively recently (e.g., is "warm").

Between time T1 and a later time T2, host page 13 (and therefore corresponding physical page 11) was deemed "cold" and as a result compressed. The compressed version of physical page 11 is stored in a first portion of physical page 2 (i.e., a first portion of PP2 that is less than the entirety of PP2). Physical page 2 was therefore, removed from the free page list and placed in the allocated page list in order to store the compressed version of physical page 11.

Accordingly, at time T2, the PTE for host page 7 is illustrated as unchanged for time T1. Likewise, at time T2, the PTE for host page 29 is illustrated as unchanged for time T1. However, at time T2, the PTE for host page 13 is illustrated as indicating that physical page PP2 is storing a compressed version of host page 13 (a.k.a., physical page 11) at the location in physical page 2 indicated by the location index field (PP11 index into physical page 2—PP11 IDX). Finally, the recency indicator in the PTE for host page 13 was updated and is thus illustrated as indicating that host page 13 has not been accessed relatively recently (e.g., is "cold").

Between time T2 and a later time T3, host page 29 (and therefore corresponding physical page 12) was also deemed "cold" and as a result compressed. The compressed version of physical page 12 is stored in a second portion of physical page 2 (i.e., a second portion of PP2 that is less than the entirety of PP2). The compressed version of physical page 12 may stored in a second portion of physical page 2 (as opposed to another physical page) because the total space occupied by the compressed versions of PP11 and PP12 is less than the entirety of PP2. In other words, there was enough room left in PP2 to store the compressed version of PP12.

Accordingly, at time T3, the PTE for host page 7 is illustrated as unchanged for time T2. However, at time T3, the PTE for host page 29 is illustrated as indicating that physical page PP2 is storing a compressed version of host page 29 (a.k.a., physical page 12) at the location in physical page 2 indicated by the location index field (PP12 index into physical page 2—PP12 IDX). The recency indicator in the PTE for host page 13 was updated and is thus illustrated as indicating that host page 13 has not been accessed in a very long time recently (e.g., is "frozen"). The recency indicator in the PTE for host page 29 was also updated and is thus illustrated as indicating that host page 29 has not been accessed relatively recently (e.g., is "cold").

Between time T3 and a later time T4, memory space demands (e.g., request for a new page to store host page 17, number of free pages falling below a minimum free pages threshold, etc.) result in the uncompressed "cached" copy of physical page P11 being placed on the free page list. In particular, in the example illustrated in FIG. 2, physical page 1 is allocated to store host page 17 and physical page 11 which was storing the uncompressed "cached" copy of host page 13 is moved to the free page list.

Accordingly, at time T4, the free page list includes physical page 11 and the allocated page list includes physical page 1. Also at time T4, the PTE for host page 7 is illustrated as unchanged for time T3. Likewise, at time T4, the PTE for host page 29 is illustrated as unchanged for time T3. However, at time T4, the PTE for host page 13 is illustrated as indicating that no physical page is storing an uncompressed version of host page 13, but a compressed version of host page 13 (formerly physical page 11) is stored at the location in physical page 2 indicated by the location index field (PP11 index into physical page 2—PP11 IDX). The recency indicator in the PTE for host page 13 remains the same and is thus illustrated as indicating that host page 13 has not been accessed in a very long time recently (e.g., is "frozen"). The page table at time T4 also includes an entry for the newly allocated physical page 1 to store host page 17. The PTE for host page 17 is illustrated as indicating that the physical page 1 corresponds to the host page 17, and that there is no compressed physical page storing a compressed version of host page 17 or physical page 12 (therefore, the CPG field is illustrated as a NULL pointer). Accordingly, since there is no compressed version of host page 17, the location index in the PTE for host page 17 is illustrated as not valid (NV). Finally, the recency indicator in the PTE for host page 17 is illustrated as indicating that host page 17 has been accessed relatively recently (e.g., is "warm").

Figure 3:
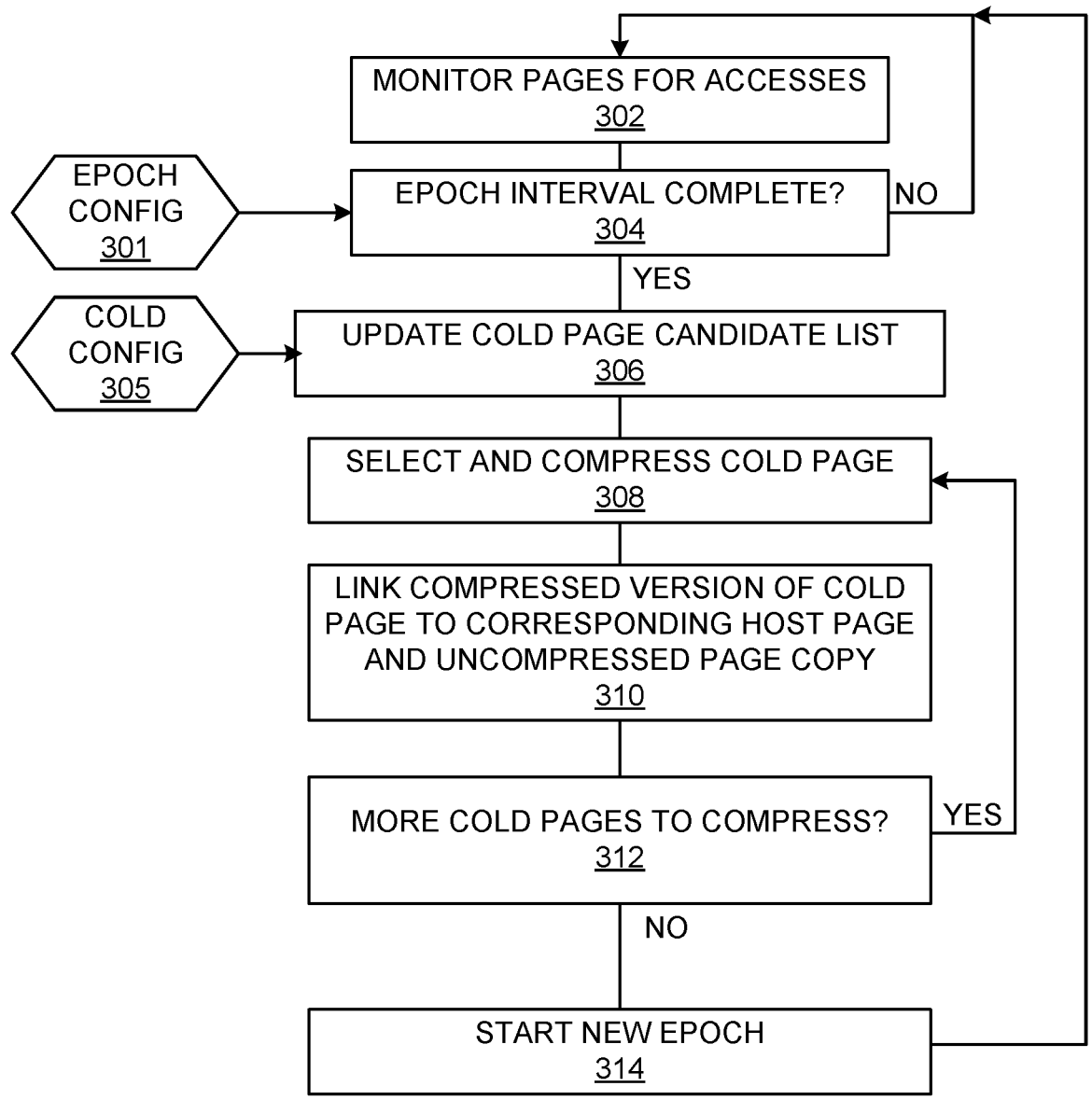
FIG. 3 is a flowchart illustrating a method of caching uncompressed pages.

FIG. 3 is a flowchart illustrating a method of caching uncompressed pages. One or more of the steps illustrated in FIG. 3 may be performed by, for example, system 100 and/or its components. Memory pages are monitored for accesses (302). For example, control circuitry 114 may monitor (e.g., using one or more page tables) pages in uncompressed pages 141 and compressed pages 149 for accesses by system node 150 and/or additional nodes 153. When a page is accessed, control circuitry 114 may, for example, set an indicator or increment/decrement a count (e.g., count or indicator stored in or in association with a page and/or a page table entry) that the corresponding page has been accessed.

If an epoch interval is complete, flow proceeds to box 306. If an epoch interval is not complete, flow proceeds back to box 302 (304). Whether an epoch interval is complete is based on epoch configuration information 301 (e.g., part of configuration information 115). For example, control circuitry 114 may determine that an epoch interval (e.g., time, number of accesses, number of refresh intervals, etc.) has met a threshold condition. This threshold condition may be configurable (e.g., as part of configuration information 115).

In box 306, a cold page candidate list is updated (306). For example, after an epoch interval is complete, control circuitry 114 may change an indicator associated with each page that is associated with how recently that respective page was accessed. Whether a given page is to be placed on the "cold page" list is based on "cold page" configuration information 305 (e.g., part of configuration information 115). For example, at the end of each epoch interval, control circuitry 114 may increment a counter field in each page's page table entry. This counter field is set to zero each time the associated page is accessed. In this manner, pages that are not accessed over a number of epoch periods will have high counts in this field and those that have been accessed recently will have low counts in this field. Pages whose counts meet a threshold condition (e.g., exceed a configurable number, or are among the highest N number of counts among all pages—where N is configurable) are indicated to be compressed. An example page table entry for page "A", which is uncompressed, with a count not meeting the threshold condition is illustrated in FIG. 5A. An example page table entry for page "A", which is still uncompressed, with a count meeting the threshold condition is illustrated in FIG. 5B.

A cold page is selected and compressed (308). For example, control circuitry 114 may select a page that is indicated to be compressed by virtue of having not been accessed for a threshold period of time and have it provided to compression circuitry 112. The compressed version is of the cold page is linked to the corresponding host page and uncompressed page copy (310). For example, control circuitry 114 may copy the compressed version of page "A" to physical page "B" and write a pointer to page "B" and an index to the start of page "A" in page "B" in the page table entry for page "A". An example page table entry for page "A" which has an uncompressed page copy remaining in physical page "A" and a compressed version in physical page "B" is illustrated in FIG. 5C.

If there are no more cold pages to compress, flow proceeds to box 314. In box 314, a new epoch is started and flow proceeds back to box 302. If there are more ancient pages to compress, flow proceed back to box 308 (312). For example, control circuitry 114 may proceed to compress copies of cold pages until there are no more pages indicated to be compressed. Once there are no more cold pages to compress, control circuitry 114 may start another epoch interval while monitoring the accesses to pages.

Figure 4:
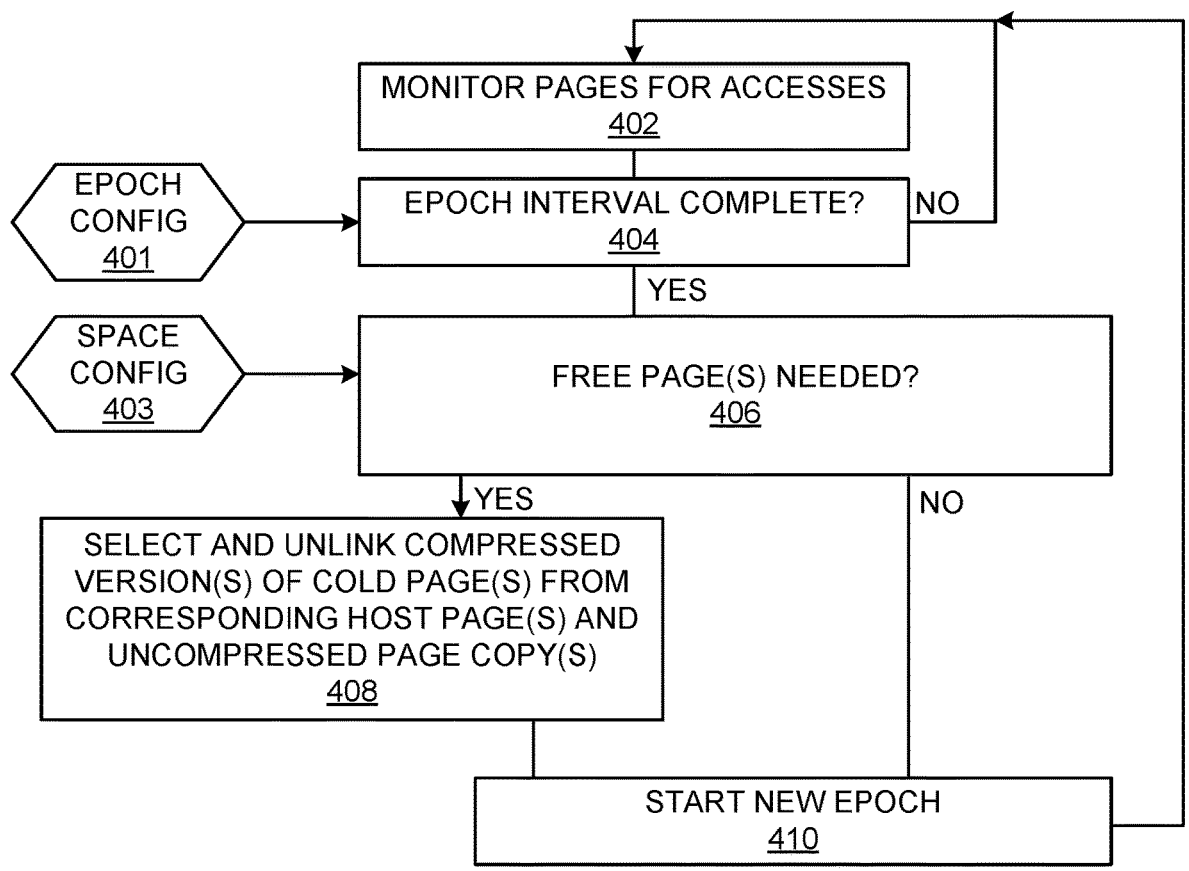
FIG. 4 is a flowchart illustrating a method of maintaining a minimum amount of free space.

FIG. 4 is a flowchart illustrating a method of maintaining a minimum amount of free space. One or more of the steps illustrated in FIG. 4 may be performed by, for example, system 100 and/or its components. Memory pages are monitored for accesses (402). For example, control circuitry 114 may monitor (e.g., using one or more page tables) pages in uncompressed pages 141 and compressed pages 149 for accesses by system node 150 and/or additional nodes 153. When a page is accessed, control circuitry 114 may, for example, set an indicator or increment/decrement a count (e.g., count or indicator stored in or in association with a page and/or a page table entry) that the corresponding page has been accessed.

If an epoch interval is complete, flow proceeds to box 406. If an epoch interval is not complete, flow proceeds back to box 402 (404). Whether an epoch interval is complete is based on epoch configuration information 401 (e.g., part of configuration information 115). For example, control circuitry 114 may determine that an epoch interval (e.g., time, number of accesses, number of refresh intervals, etc.) has met a threshold condition. This threshold condition may be configurable (e.g., as part of configuration information 115).

In box 406, it is determined whether additional free pages are needed (306). Whether at least one free page is needed (e.g., for uses other than holding uncompressed copies of pages with compressed versions) is based on space configuration information 403 (e.g., part of configuration information 115). For example, after an epoch interval is complete, control circuitry 114 may determine whether the number of pages in a "free" page list meets a threshold condition. This threshold condition may be, for example, that there is less than a configured minimum number of pages in the "free" page list. This threshold condition may be configurable (e.g., as part of configuration information 115).

If additional free pages are not needed, flow proceeds from box 406 to box 410. If additional free pages are needed, flow proceeds to box 408. In box 408, one or more pages are selected and the uncompressed copies of those one or more pages are unlinked from the corresponding one or more host pages and one or more compressed pages. For example, based on the access tracking indicators, control circuitry 114 may select the least recently accessed set of pages to have the physical pages storing their corresponding uncompressed page copies unlinked from their corresponding host page and compressed page and the physical pages placed in the "free" page list. An example page table entry for page "A", which has had its uncompressed copy unlinked but retains a compressed copy in physical page "B" is illustrated in FIG. 5D.

FIG. 6 is a flowchart illustrating a method of operating a memory node. One or more of the steps illustrated in FIG. 6 may be performed by, for example, system 100 and/or its components. A first uncompressed version of a first page of data stored in a first page of memory is compressed to produce a compressed version of the first page of data (602). For example, uncompressed page 143a may be compressed by compression circuitry 112 to produce compressed page 143b.

The compressed version of the first page of data is written to a first portion of a second page of memory, where the first portion does not consist of an entirety of the second page of memory (604). For example, compressed page 143b may be written by buffer device 111 to a portion of compressed page 147. Based on an access directed to the first page of data, the access responded to with the first uncompressed version of the first page of data retrieved from the first page of memory (606). For example, buffer device 111 may respond to an access request from system node 150 with uncompressed data from uncompressed page 143a rather than decompressing compressed page 143b.

Figure 7:
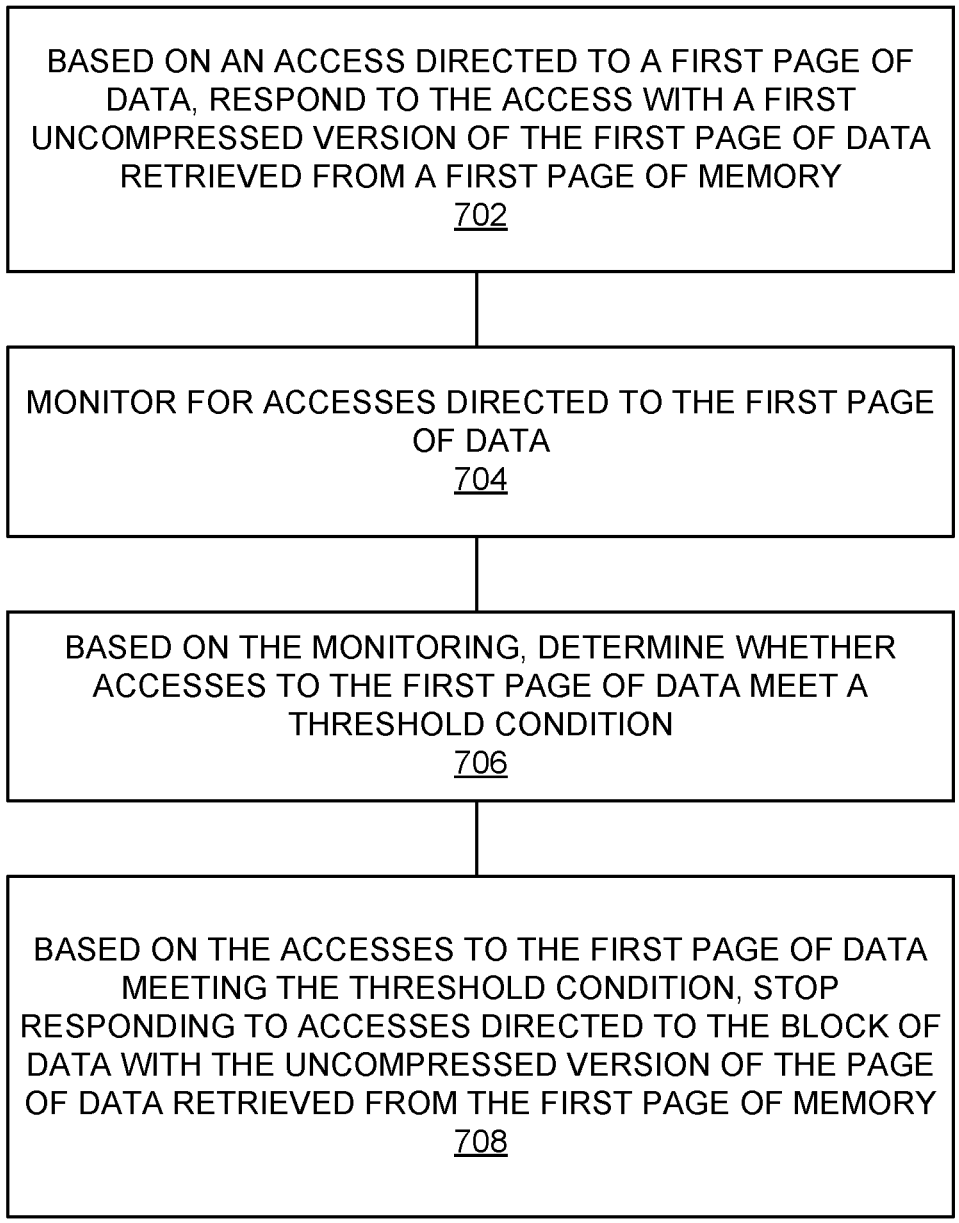
FIG. 7 is a flowchart illustrating a method of uncaching an uncompressed page.

FIG. 7 is a flowchart illustrating a method of uncaching an uncompressed page. One or more of the steps illustrated in FIG. 7 may be performed by, for example, system 100 and/or its components. Based on an access directed to a first page of data, the access is responded to with a first uncompressed version of the first page of data retrieved from a first page of memory (702). For example, buffer device 111 may respond to an access request from system node 150 with uncompressed data from uncompressed page 143a rather than decompressing compressed page 143b.

Accesses directed to the first page of data are monitored (704). For example, after an epoch interval is complete, control circuitry 114 may change an indicator associated with each page that is associated with how recently that respective page was accessed. For example, at the end of each epoch interval, control circuitry 114 may increment a counter field in each page's page table entry. This counter field is set to zero each time the associated page is accessed. In this manner, pages that are not accessed over a number of epoch periods will have high counts in this field and those that have been accessed recently will have low counts in this field.

Based on the monitoring, whether accesses to the first page of data meet a threshold condition is determined (706). For example, control circuitry 114 may (e.g., using page table entries) find pages with uncompressed copies (e.g., page 143a) whose access or lack of access counts meet a threshold condition (e.g., exceed a configurable number, or are among the highest N number of counts among all pages—where N is configurable). Based on the accesses to the first page of data meeting the threshold condition, responding to accesses directed to the block of data with the uncompressed version of the page of data retrieved from the first page of memory is stopped (708). For example, control circuitry 114 may stop using uncompressed page 143a to respond to access requests from system node 150 that are directed to the host page address range associated with compressed page 143b. The physical memory page associated with uncompressed page 143a may then be "freed" for other uses.

Figure 8:
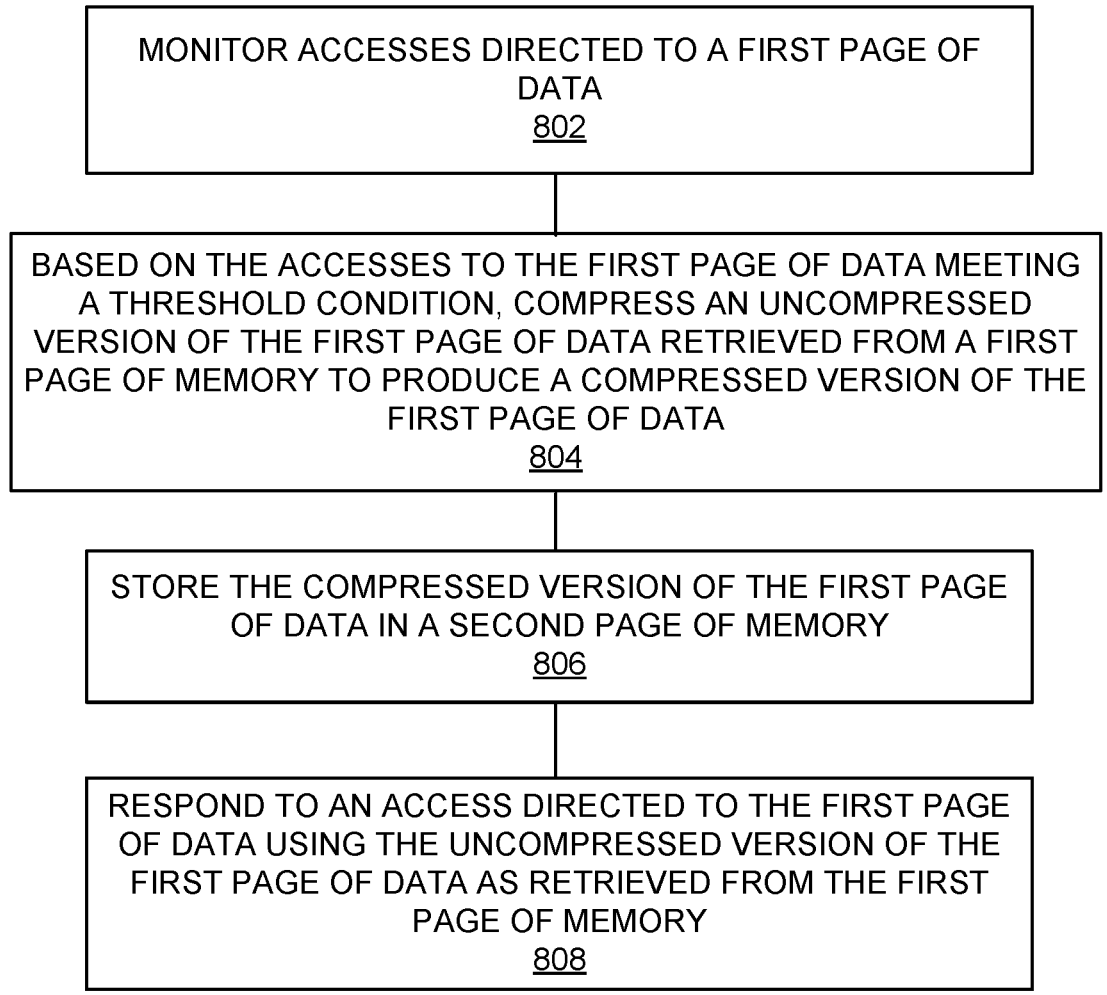
FIG. 8 is a flowchart illustrating a method of using an uncompressed page cache.

FIG. 8 is a flowchart illustrating a method of utilizing unallocated memory space for an uncompressed page cache. One or more of the steps illustrated in FIG. 8 may be performed by, for example, system 100 and/or its components. Accesses directed to a first page of data are monitored (802). For example, control circuitry 114 may maintain an access counter in a page table entry associated with the host page corresponding to uncompressed page 142a. This access counter may reset to an initial value each time the host page corresponding to uncompressed page 142a is accessed and then periodically (e.g., after a configurable epoch interval) count up (or down).

Based on the accesses to the first page of data meeting a threshold condition, an uncompressed version of the first page of data retrieved from a first page of memory is compressed to produce a compressed version of the first page of data (804). For example, when the access counter in the page table entry associated with uncompressed page 142a meets a threshold condition (e.g., exceed a configurable number, or are among the highest N number of counts among all pages—where N is configurable) uncompressed page 142a may be provided from physical memory to compression circuitry 112 to produce compressed page 142b. The compressed version of the first page of data is stored in a second page of memory (806). For example, compressed page 143b may be written by buffer device 111 to compressed page 147.

An access directed to the first page of data is responded to using the uncompressed version of the first page of data as retrieved from the first page of memory (810). For example, in response to an access by system node 150 directed to the host page associated with uncompressed page 143a or compressed page 143b, buffer device 111 may provide, to system node 150, uncompressed page 143a as retrieved from physical memory.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory system 100, and its components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 9 mm magnetic tape, 3½ inch floppy media, CDs, DVDs, and so on.

Figure 9:
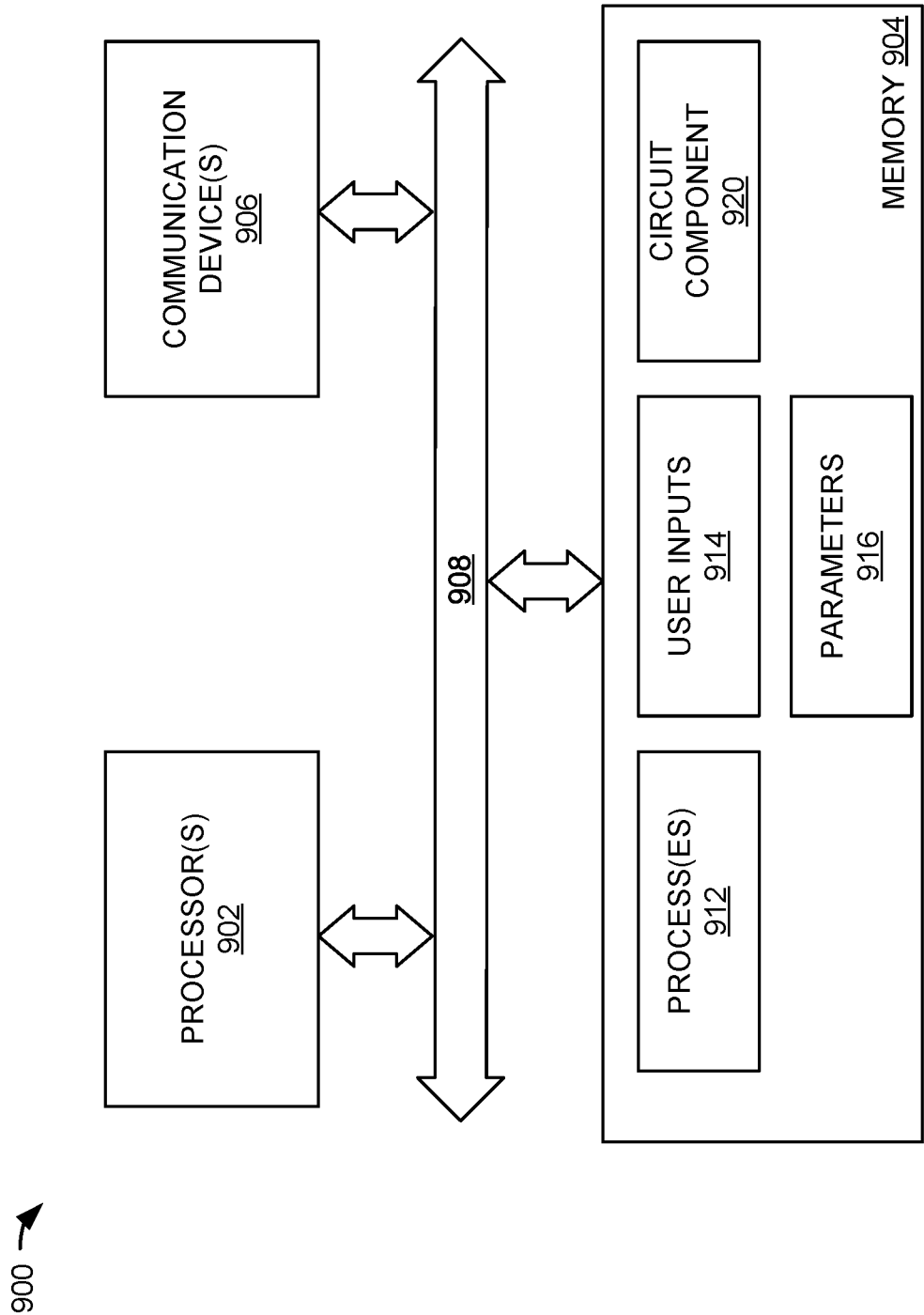
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of memory system 100 and its components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: A memory buffer device, comprising: data compression circuitry to compress an uncompressed version of a first page sized block of data read from a first single page of memory and produce a compressed version of the first page sized block of data; circuitry to write the compressed version of the first page sized block of data to a first portion of a second single page of memory, where the first portion does not consist of an entirety of the second single page of memory; and circuitry configured to determine whether the uncompressed version of the first page sized block of data is available to be accessed, and to, in response to an access directed to an address associated with the first page sized block of data when the compressed version of the first page sized block of data is available to be accessed, read the uncompressed version of the first page sized block of data from the first single page of memory and provide the uncompressed version of the first page sized block of data to a host interface as a response to the access directed to an address associated with the first page sized block of data.

Example 2: The memory buffer device of claim 1, further comprising: circuitry configured to monitor accesses of the first page sized block of data and to, based on the first page sized block not being accessed for a threshold amount of time, discontinue providing the uncompressed version of the first page sized block of data from the first single page of memory.

Example 3: The memory buffer device of claim 2, the threshold amount of time is configurable.

Example 4: The memory buffer device of claim 3, wherein an amount of time between evaluations of whether the first page sized block of data has been accessed is configurable.

Example 5: The memory buffer device of claim 1, wherein an amount of memory space available to store uncompressed versions of page sized data blocks is configurable.

Example 6: The memory buffer device of claim 1, wherein an amount of memory space available to store uncompressed versions of page sized data blocks is based on an amount of free memory space.

Example 7: The memory buffer device of claim 1, wherein a compressed version of a third page sized block of data is to be written to a second portion of the second single page of memory, where the second portion does not consist of the entirety of the second single page of memory.

Example 8: A method of operating a memory node, comprising: compressing a first uncompressed version of a first page of data stored in a first page of memory to produce a compressed version of the first page of data; writing the compressed version of the first page of data to a first portion of a second page of memory, where the first portion does not consist of an entirety of the second page of memory; and based on an access directed to the first page of data, responding to the access with the first uncompressed version of the first page of data retrieved from the first page of memory.

Example 9: The method of claim 8, further comprising: monitoring for accesses directed to the first page of data; based on the monitoring, determining whether accesses to the first page of data meet a threshold condition; and based on accesses to the first page of data meeting the threshold condition, stopping responding to accesses directed to the first page of data with the first uncompressed version of the first page of data retrieved from the first page of memory.

Example 10: The method of claim 9, further comprising: based on accesses to the first page of data meeting the threshold condition, decompressing the first portion of the second page of memory to produce a second uncompressed version of the first page of data.

Example 11: The method of claim 10, further comprising: based on accesses to the first page of data meeting the threshold condition, responding to an access directed to the first page of data with the second uncompressed version of the first page of data.

Example 12: The method of claim 11, wherein the threshold condition is based on a frequency of accesses directed to the first page of data.

Example 13: The method of claim 11, wherein the threshold condition is based on a lack of accesses directed to the first page of data over a first time period.

Example 14: The method of claim 13, further comprising: configuring the first time period.

Example 15: A non-transitory computer readable medium having instructions stored thereon for operating a memory node that, when executed by a computer, at least instruct the computer to: compress a first uncompressed version of a first page of data stored in a first page of memory to produce a first compressed version of the first page of data; write the first compressed version of the first page of data to a portion of a second page of memory; and based on an access directed to the first page of data, respond to the access with the first uncompressed version of the first page of data retrieved from the first page of memory.

Example 16: The non-transitory computer readable medium of claim 15, wherein the computer is further instructed to: monitor for accesses directed to the first page of data;

based on the monitoring, determine whether accesses to the first page of data meet a threshold condition; and based on accesses to the first page of data meeting the threshold condition, stop responding to accesses directed to the first page of data with the first uncompressed version of the first page of data retrieved from the first page of memory.

Example 17: The non-transitory computer readable medium of claim 16, wherein the threshold condition is based on a frequency of accesses directed to the first page of data.

Example 18: The non-transitory computer readable medium of claim 16, wherein the threshold condition is based on a lack of accesses directed to the first page of data over a first time period.

Example 19: The non-transitory computer readable medium of claim 18, wherein the computer is further instructed to: configure the first time period.

Example 20: The non-transitory computer readable medium of claim 19, wherein the threshold condition is based on a relative frequency of access between the first page of data and a second page of data stored in a third page of memory, and the computer is further instructed to: based on the relative frequency of access between the first page of data and the second page of data, overwrite the first uncompressed version of the first page of data in the first page of memory with an uncompressed version of a third page of data.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory buffer device, comprising:
   data compression circuitry to compress an uncompressed version of a first page sized block of data associated with a first host page address and read from a first single page of memory and produce a compressed version of the first page sized block of data;
   circuitry to write the compressed version of the first page sized block of data to a first portion of a second single page of memory, where the first portion does not consist of an entirety of the second single page of memory;
   circuitry configured to associate, using a page table entry, the first host page address, the first single page of memory, and the second single page of memory that is storing the compressed version of the first page sized block of data; and
   circuitry to, in response to an access directed to an address associated with the first host page address when the compressed version of the first page sized block of data is available to be accessed from the second single page of memory and based on the association between the first host page address and the first single page of memory in the page table entry, read the uncompressed version of the first page sized block of data from the first single page of memory and provide the uncompressed version of the first page sized block of data to a host interface as a response to the access directed to the address associated with first host page address.

2. The memory buffer device of claim 1, further comprising:
   circuitry configured to monitor accesses of the first page sized block of data and to, based on the first page sized block not being accessed for a threshold amount of time, disassociate, using the page table entry, the first host page address from the first single page of memory.

3. The memory buffer device of claim 2, the threshold amount of time is configurable.

4. The memory buffer device of claim 3, wherein an amount of time between evaluations of whether the first page sized block of data has been accessed is configurable.

5. The memory buffer device of claim 1, wherein an amount of memory space available to store uncompressed versions of page sized data blocks is configurable.

6. The memory buffer device of claim 1, wherein an amount of memory space available to store uncompressed versions of page sized data blocks is based on an amount of free memory space.

7. The memory buffer device of claim 1, wherein a compressed version of a third page sized block of data is to be written to a second portion of the second single page of memory, where the second portion does not consist of the entirety of the second single page of memory.

8. A method of operating a memory node, comprising:
associating, using a page table entry, a first page of memory with a first host address;
compressing a first uncompressed version of a first page of data stored in the first page of memory to produce a compressed version of the first page of data;
writing the compressed version of the first page of data to a first portion of a second page of memory, where the first portion does not consist of an entirety of the second page of memory;
after writing the compressed version of the first page of data to the first portion of the second page of memory, associating, using the page table entry, the first portion of the second page of memory that is storing the compressed version of the first page of data with the first host address and the first page of memory; and
based on an access directed to the first page of data and the association by the page table entry of the first page of memory to the first host address, responding to the access with the first uncompressed version of the first page of data retrieved from the first page of memory.

9. The method of claim 8, further comprising:
monitoring for accesses directed to the first page of data;
based on the monitoring, determining whether accesses to the first page of data meet a threshold condition; and
based on accesses to the first page of data meeting the threshold condition, disassociating, by the page table entry, of the first host address and the first page of memory and stopping, based on the page table entry, responding to accesses directed to the first page of data with the first uncompressed version of the first page of data retrieved from the first page of memory.

10. The method of claim 9, further comprising:
based on accesses to the first page of data meeting the threshold condition, decompressing the first portion of the second page of memory to produce a second uncompressed version of the first page of data.

11. The method of claim 10, further comprising:
based on accesses to the first page of data meeting the threshold condition, responding to an access directed to the first page of data with the second uncompressed version of the first page of data.

12. The method of claim 11, wherein the threshold condition is based on a frequency of accesses directed to the first page of data.

13. The method of claim 11, wherein the threshold condition is based on a lack of accesses directed to the first page of data over a first time period.

14. The method of claim 13, further comprising:
configuring the first time period.

15. A non-transitory computer readable medium having instructions stored thereon for operating a memory node that, when executed by a computer, at least instruct the computer to:
associate, using a page table entry, a first page of memory with a first host address;
compress a first uncompressed version of a first page of data stored in the first page of memory to produce a first compressed version of the first page of data;
write the first compressed version of the first page of data to a first portion of a second page of memory;
after writing the compressed version of the first page of data to the first portion of the second page of memory, associate, using the page table entry, the first portion of the second page of memory that is storing the compressed version of the first page of data with the first host address and the first page of memory; and
based on an access directed to the first page of data and the association by the page table entry of the first page of memory to the first host address, respond to the access with the first uncompressed version of the first page of data retrieved from the first page of memory.

16. The non-transitory computer readable medium of claim 15, wherein the computer is further instructed to:
monitor for accesses directed to the first page of data;
based on the monitoring, determine whether accesses to the first page of data meet a threshold condition; and
based on accesses to the first page of data meeting the threshold condition, disassociate, by the page table entry, the first host address and the first page of memory and stop, based on the page table entry, responding to accesses directed to the first page of data with the first uncompressed version of the first page of data retrieved from the first page of memory.

17. The non-transitory computer readable medium of claim 16, wherein the threshold condition is based on a frequency of accesses directed to the first page of data.

18. The non-transitory computer readable medium of claim 16, wherein the threshold condition is based on a lack of accesses directed to the first page of data over a first time period.

19. The non-transitory computer readable medium of claim 18, wherein the computer is further instructed to:
configure the first time period.

20. The non-transitory computer readable medium of claim 19, wherein the threshold condition is based on a relative frequency of access between the first page of data and a second page of data stored in a third page of memory, and the computer is further instructed to:
based on the relative frequency of access between the first page of data and the second page of data, overwrite the first uncompressed version of the first page of data in the first page of memory with an uncompressed version of a third page of data.

* * * * *